United States Patent [19]

Olson, Jr.

[11] 3,933,170

[45] Jan. 20, 1976

[54] APPARATUS FOR SECURING A LINE TAP VALVE TO THE EXTERIOR OF A TUBING LINE

[75] Inventor: John W. Olson, Jr., Oklahoma City, Okla.

[73] Assignee: C & D Valve Manufacturing Company, Oklahoma City, Okla.

[22] Filed: Mar. 20, 1975

[21] Appl. No.: 560,563

[52] U.S. Cl. .............................. 137/318; 285/197
[51] Int. Cl.² .................... B23B 41/08; F16L 41/04
[58] Field of Search ............... 137/315, 317, 318; 285/197, 198, 199; 29/157 R

[56] References Cited
UNITED STATES PATENTS

| | | | |
|---|---|---|---|
| 390,490 | 10/1888 | Letzkus | 137/317 |
| 3,336,937 | 8/1967 | Ehrens et al. | 137/318 |
| 3,543,788 | 12/1970 | Mullins | 137/318 |
| 3,606,398 | 9/1971 | Bocceda | 285/197 |
| 3,788,345 | 1/1974 | Tura | 137/318 |

*Primary Examiner*—Irwin C. Cohen
*Assistant Examiner*—George L. Walton
*Attorney, Agent, or Firm*—Laney, Dougherty, Hessin & Fish

[57] ABSTRACT

An improved apparatus for securing an externally threaded line tap valve to the exterior of a penetrable tubing line such as that found in a closed refrigeration system. The apparatus is adapted to secure a line tap valve to a line having any of a plurality of outside diameters. The apparatus includes a body member having a threaded passage extending therethrough and a substantially square lateral cross-section. A first cylindrical outer surface is formed adjacent one end face of the body member and a second cylindrical outer surface is formed intermediate the first cylindrical outer surface and the opposite end face of the body member. The apparatus also includes a bifurcated spring clip member having an upwardly facing V-shaped bottom portion and inwardly facing lips formed on the two upwardly extending parallel leg portions having arcuately shaped vertical notches formed respectively therein for engaging and retaining either of the cylindrical outer surfaces of the body member therein when the apparatus is assembled. A spacer member is included for interposition between the clip member and the tubing to which the apparatus is to be secured when tubing of smaller diameter is involved. The threaded line tap valve is threadedly received within the threaded passage through the body member when the line tap valve penetrates the tubing.

13 Claims, 11 Drawing Figures

APPARATUS FOR SECURING A LINE TAP VALVE TO THE EXTERIOR OF A TUBING LINE

BACKGROUND OF THE INVENTION

1. Field of the Invention

This invention relates generally to improvements in valves, and more particularly, but not by way of limitation, to valve structure employed in tapping tubular members.

2. Description of the Prior Art

The prior art contains a number of teachings of apparatus for securing externally threaded line tap valves to the exterior of penetrable tubing for obtaining controlled access to the interior of the tubing, particularly, for accessing sealed refrigeration systems for servicing. Some of the prior art devices require soldering of the apparatus directly to the tubing which is inherently inconvenient and cannot be accomplished in potentially explosive environments. Other devices are known which are adapted to secure a line tap valve through clamping means to tubing having one specific O.D. These latter devices, however, require that a serviceman have one device of each size for each standard tubing O.D. which the serviceman might encounter on the job. Other apparatus are available which provide means for securing line tap valves to tubing of any one of a plurality of outer diameters, however, such apparatus are generally cumbersome to manipulate, unreliable in operation and difficult and expensive to manufacture.

SUMMARY OF THE INVENTION

The present invention contemplates apparatus for securing an externally threaded line tap valve to the exterior of a penetrable tubing line having any of a plurality of outside diameters. The apparatus includes a body member having a substantially square lateral cross-section normal to the longitudinal axis thereof. The body member further includes a first end face and a second end face normal to the longitudinal axis. An internally threaded longitudinal passage extends between the first and second end faces. A first cylindrically shaped outer surface communicates with the first end face and is coaxial with the longitudinal passage. A second cylindrically shaped outer surface is formed on the body member and is coaxial with the first cylindrically shaped outer surface and has a diameter equal to the diameter of the first cylindrically shaped outer surface and is positioned intermediate the first cylindrically shaped outer surface and the second end face of the body member. The longitudinal widths of the first and second cylindrically shaped outer surfaces, the longitudinal distance between the first and second cylindrically shaped outer surfaces and the longitudinal distance between the second cylindrically shaped outer surface and the second end face of the body member are substantially equal.

The apparatus further includes a bifurcated clip member having a first lateral end face and a second lateral end face and a longitudinal length substantially equal to the width of the substantially square lateral cross-section of the body member. The clip member further includes an upwardly facing V-shaped bottom portion having an included angle of 90°. A pair of parallel leg portions extend upwardly from the respective outer ends of the upwardly facing V-shaped bottom portion. A pair of horizontally coplanar lips extend inwardly toward each other from the upper ends of the respective parallel leg portions. The inward edges of the lips are substantially parallel to each other and extend between the first and second lateral end faces of the bifurcated clip member. Each lip edge includes an arcuately shaped vertical notch formed therein intermediate the first and second end faces of the clip member. The notches are sized, shaped and laterally spaced from one another to complementarily and alternately receive the first and second cylindrically shaped outer surfaces of the body member therebetween. Each lip edge includes a laterally outwardly extending surface formed thereon adjacent to and communicating with the first end face and the second end face of the clip member, respectively. The lateral distance between the parallel portions of the lip edges extending between the laterally outwardly extending surfaces and the vertical notches of the lip edges is less than the diameter of the cylindrical outer surfaces of the body member.

An object of the present invention is to provide apparatus for securing an externally threaded line tap valve to the exterior of a penetrable tubing line having any of a plurality of outside diameters.

Another object of the present invention is to provide apparatus for securing an externally threaded line tap valve to the exterior of a tubing line which is simple to assemble in the field.

A further object of the present invention is to provide apparatus for securing an externally threaded line tap valve to the exterior of a penetrable tubing line which is economical to manufacture and operate.

Other objects and advantages of the present invention will be evident from the following detailed description when read in conjunction with the accompanying drawings.

DESCRIPTION OF THE PREFERRED EMBODIMENT

Figure 1:
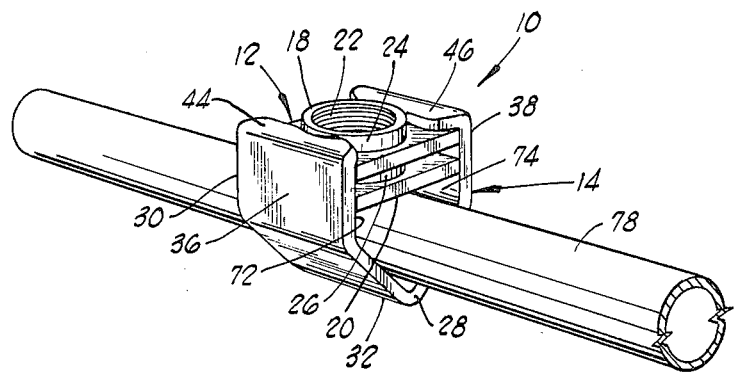
FIG. 1 is a perspective view of the apparatus of the present invention installed on a length of tubing.

Referring now to the drawings, the apparatus of the present invention will be generally designated by reference character 10. The apparatus 10 includes a body member 12 and a bifurcated spring clip member 14. In certain applications of the apparatus, 10, a V-shaped spacer member 16 is also included.

The body member 12 includes a first lateral end face 18 and a second lateral end face 20 each lying in a plane intersecting and normal to the longitudinal axis of the body member 12. The body member 12 has a substantially square lateral cross-section, and may be suitably formed of a length of square metal bar stock or the like.

An internally threaded longitudinal passage 22 extends along the longitudinal axis of the body member 12 and communicates at its opposite ends with the first lateral end face 18 and the second lateral end face 20. A first cylindrically shaped outer surface 24 is formed on the body member 12 communicating with the first end face 18 and coaxial with the longitudinal passage 22. A second cylindrically shaped outer surface 26 is formed on the body member 12 intermediate the first cylindrically shaped surface 24 and the second end face 20. The second cylindrically shaped outer surface 26 is coaxial with and has a diameter equal to the diameter of the first cylindrically shaped outer surface 24.

The longitudinal widths of the first and second cylindrical outer surfaces 24 and 26 are substantially equal, and are substantially equal to the longitudinal distance between the first and second cylindrical outer surfaces 24 and 26 and to the longitudinal distance between the second cylindrical surface 26 and the second end face 20 of the body member 12.

The clip member 14 may be suitably formed of a length of metal sheet, such as 16 gauge cold rolled steel, into a bifurcated spring. The clip member 14 has a first lateral end face 28 and a second lateral end face 30, parallel to the end face 28. The longitudinal length of the clip member 14 between the end faces 28 and 30 is preferably substantially equal to the lateral width of the square cross-section of the body member 12.

The clip member 14 includes an upwardly facing bottom portion 32 preferably having a V-shape with a preferred included angle 34 of 90°. A pair of parallel leg portions 36 and 38 extend upwardly from the respective outer ends 40 and 42 of the upwardly facing V-shaped bottom portion 32. It will be understood that the bottom portion 32 may be arcuately or otherwise shaped rather than V-shaped, as is preferred.

A pair of horizontally coplanar lips 44 and 46 extend inwardly toward each other from the respective upper ends 48 and 50 of the parallel leg portions 36 and 38. The inward edges 52 and 54 of the lips 44 and 46 are substantially mutually parallel and extend between the first and second end faces 28 and 30 of the clip member 14. The lip edges 52 and 54 include arcuately shaped vertical notches 56 and 58 formed respectively therein interemdiate the first and second end faces 28 and 30 of the clip member 14. The notches 46 and 58 are sized, shaped and laterally spaced from one another to complementarily and alternately receive the first and second cylindrical outer surfaces 24 and 26 of the body member therebetween when the clip member 14 is in the relaxed position.

The lip edge 52 includes a laterally outwardly extending surface 60 formed thereon adjacent to and communicating with the first end face 28 and a second laterally outwardly extending surface 62 formed thereon adjacent to and communicating with the second end face 30 of the clip member 14. Similarly, the lip edge 54 includes a laterally outwardly extending surface 64 formed thereon adjacent to and communicating with the first end face 28 and a second laterally outwardly extending surface 66 formed thereon adjacent to and communicating with the second end face 30 of the body member 14. The lateral distance 68 between the parallel portions of the lip edges 52 and 54 extending between the laterally outwardly extending surfaces and the vertical notches of the lip edges 52 and 54 is less than the diameter of the cylindrical outer surfaces 24 and 26 of the body member 12.

It should be noted that the vertical thickness of the horizontal lips 44 and 46 is slightly less than the longitudinal width of the second cylindrically shaped outer surface 26 of the body member 12. It should also be noted that the lateral distance 70 between the inner walls 72 and 74 of the parallel leg portions 36 and 38 of the clip member 14 is slightly greater than the lateral width of the square lateral cross-section of the body member 12 when the clip member 14 is in the relaxed position.

Figure 3:
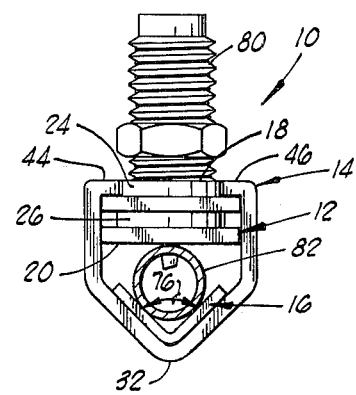
FIG. 3 is an end view similar to FIG. 2 illustrating the apparatus installed on a length of tubing of a diameter less than that of FIG. 2.
Figure 4:
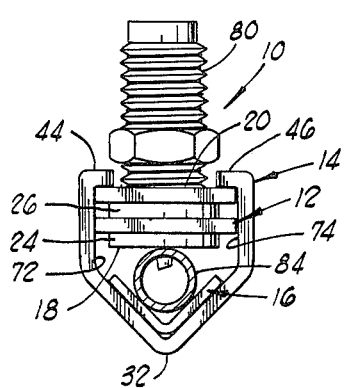
FIG. 4 is an end view similar to FIG. 3 illustrating the apparatus installed on a length of tubing of a diameter less than that of FIG. 3.

The V-shaped spacer member 16, shown in FIGS. 3 and 4, is preferably formed of a length of metallic sheet, preferably 16 gauge cold rolled steel, as is the previously described clip member 14. The spacer member 16 has a preferred included angle 76 of 90° and has a longitudinal length preferably equal to the longitudinal length of the clip member 14 between the end faces 28 and 30. The spacer member 16 is slidably disposed within the V-shaped bottom portion 32 of the clip member 14 when employing the apparatus 10 to secure a line tap valve to a typical tubing line of smaller diameters such as 5/16 or ¼ inch O.D., as illustrated, respectively, in FIGS. 3 and 4. It will be understood that the spacer members 16 may be arcuately or otherwise shaped rather than V-shaped, as is preferred.

Figure 2:
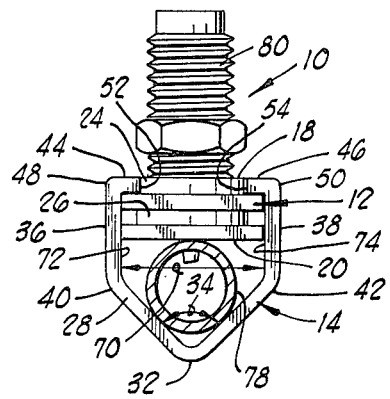
FIG. 2 is an end view of the apparatus shown in FIG. 1.

The apparatus 10 is illustrated in FIG. 1 secured to a length of tubing 78. The configurations of the body member 12 and clip member 14 of the apparatus 10 are such that they are properly assembled as shown in FIG. 1 when the length of tubing 78 has an O.D. of ⅜ inch. The apparatus 10 is positioned on the tubing 78 by first placing the clip member 14 about the tubing 78 with the tubing 78 engaging the upwardly facing V-shaped bottom portion 32 of the clip member 14. The body member 10 is then moved along the length of tubing 78 along a line parallel to the longitudinal axis of the clip member 14 until the body member 12 is received within the inner wall 72 and 74 of the clip member 14 and the first cylindrically shaped outer surface 24 of the body member 12 is snapped into engagement with the vertical notches 56 and 58 of the lips 44 and 46 with the end face 20 of the body member 12 adjacent to the exterior of the tubing 78. At this point a suitable externally threaded line tap valve 80 may be threadedly secured within the internally threaded longitudinal passage 22 of the body member 12 to provide access to the interior of the tubing 78 as shown in FIG. 2. Such a suitable line tap valve is disclosed at 14 in U.S. Pat. No. 3,543,788 to John W. Mullins, which is incorporated herein by reference.

FIG. 3 illustrates the apparatus 10 installed on a length of tubing 82 having an O.D. of 5/16 inch. The installation of the apparatus 10 on the tubing 82 is substantially identical to that described above for the tubing 78 with the exception that the V-shaped spacer member 16 is interposed between the tubing 82 and the upwardly facing V-shaped bottom portion 32 of the clip member 14 prior to the mutual engagement of the body member 12 with the clip member 14.

FIG. 4 illustrates the apparatus 10 as assembled on a length of tubing 84 having a ¼ inch O.D. To assemble the apparatus 10 on the tubing 84, the V-shaped spacer member 16 is first disposed within the upwardly facing V-shaped bottom portion 32 of the clip member 14 and the tubing 84 is positioned adjacent to and within the V-shaped spacer member 16. The body member 12 is inverted with the second end face 20 facing upwardly and is moved longitudinally within the inner wall 72 and 74 of the clip member 14 with the second end face 20 engaging the lower edges of the horizontal lips 44 and 46 of the clip member 14, and with the first end face 18 adjacent to the tubing 84. The line tap valve 80 is then threadedly engaged with the internally threaded passage 22 of the body member 12 in a manner as discussed above to penetrate the tubing 84.

Figure 5:
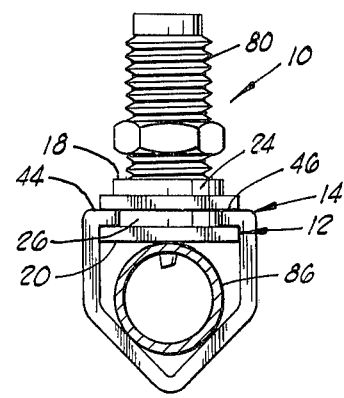
FIG. 5 is an end view similar to FIG. 2 illustrating the apparatus installed on a length of tubing of a diameter greater than that of FIG. 2.
Figure 6:
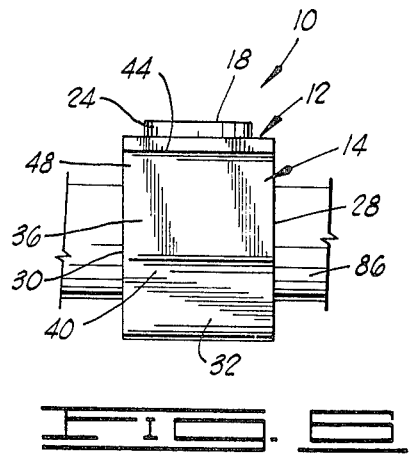
FIG. 6 is a side view of the apparatus of FIG. 5.
Figure 7:
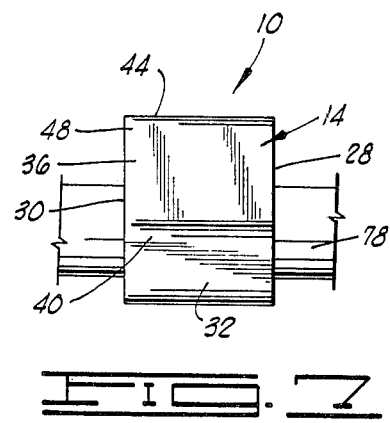
FIG. 7 is a side view of the apparatus of FIG. 1.
Figure 8:
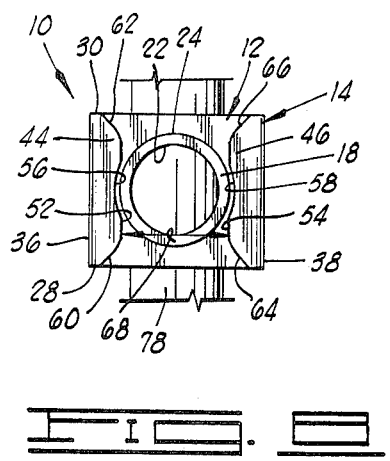
FIG. 8 is a top view of the apparatus of FIG. 1.
Figure 9:
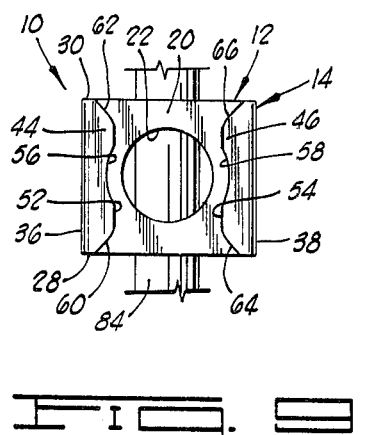
FIG. 9 is a top view of the apparatus of FIG. 4.
Figure 10:
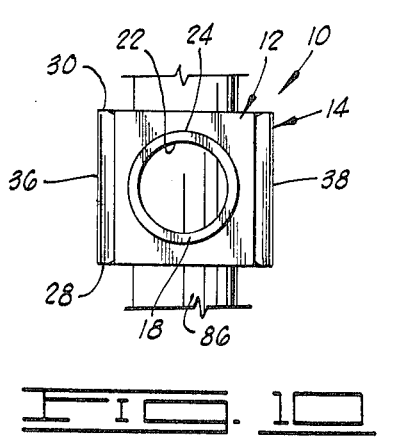
FIG. 10 is a top view of the apparatus of FIG. 5.
Figure 11:
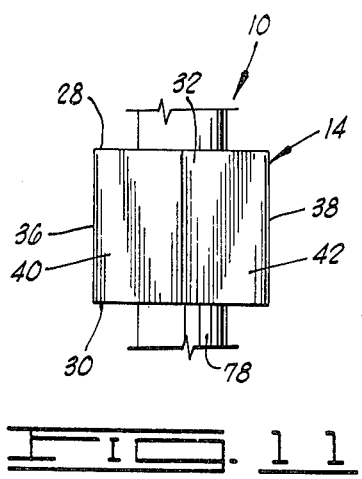
FIG. 11 is a bottom view of the apparatus of FIG. 1.

FIG. 5 illustrates the apparatus 10 assembled on a length of tubing 86 having a ½ inch O.D. The apparatus 10 is installed on the tubing 86 in a manner similar to that described above for the tubing 78 except that the body member 12 is installed within the clip member 14 by snapping the second cylindrically shaped outer surface 26 of the body member 12 into mutual engagement with the vertical notches 56 and 58 of the horizontal lips 44 and 46 with the second end face 20 of the body member 12 adjacent to the tubing 86. The line tap valve 80 is threadedly engaged within the threaded passage 22 of the body member 12 as described above to penetrate and gain access to the interior of the tubing 86.

It will be seen from the foregoing description that the apparatus 10 provides novel structure for securing a threaded line tap valve to any one of four differing diameters of tubing depending upon the manner in which the apparatus 10 is assembled. The configuration of the body member 12 and the clip member 14 provides means for securely assembling these elements together prior to the installation of the threaded line tap valve in the body member 12 to gain access to the interior of the tubing to which the apparatus 10 is secured.

Changes may be made in the construction and arrangement of parts or elements described herein without departing from the spirit and scope of the present invention.

What is claimed is:

1. Apparatus for securing an externally threaded line tap valve to the exterior of a penetrable tubing line having any one of a plurality of outside diameters, comprising:
   a body member having first and second end faces and an internally threaded longitudinal passage extending therethrough communicating the first and second end faces;
   a first cylindrical outer surface formed on said body member adjacent to the first end face thereof and coaxial with the passage therethrough;
   a second cylindrical outer surface formed on said body member intermediate said first cylindrical outer surface and the second end face of said body member and coaxial with the passage therethrough;
   bifurcated spring clip means having opposite ends for partially encircling the exterior of a penetrable tubing line and having notch means formed on the opposite ends thereof for yieldably releasably mutually engaging said first cylindrical surface and, alternately engaging said second cylindrical surface and securing said body member to the exterior of the tubing line with the second end face adjacent to the exterior of the tubing line and, alternately, with the first end face adjacent to the exterior of the tubing line.

2. The apparatus as defined in claim 1 characterized further to include:
   spacer member means for interposition between said bifurcated spring clip means and the exterior of the tubing line.

3. The apparatus as defined in claim 1 wherein said body member includes:
   a first substantially rectangular outer surface formed thereon coaxial with the passage therethrough and extending between said first and second cylindrical outer surfaces; and
   a second substantially rectangular outer surface formed thereon coaxial with the passage therethrough and extending between said second cylindrical outer surface and the second end face thereof.

4. The apparatus as defined in claim 1 wherein said bifurcated spring clip means is characterized further to include:
   an upwardly facing bottom portion having outer ends;
   a pair of parallel leg portions extending upwardly from the respective outer ends of said bottom portion; and
   a pair of horizontal lips extending inwardly toward each other from the upper ends of said respective parallel leg portions, each lip having a notch formed therein sized and shaped to releasably secure said first cylindrical outer surface and, alternately, said second cylindrical outer surface of said body member therein between said lips.

5. The apparatus as defined in claim 4 wherein said body member is characterized further to include:
   a first substantially rectangular outer surface formed thereon coaxial with the passage therethrough and extending between said first and second cylindrical outer surfaces; and
   a second substantially rectangular outer surface formed thereon coaxial with the passage therethrough and extending between said second cylindrical outer surface and the second end face thereof.

6. The apparatus as defined in claim 5 wherein said first and second substantially rectangular outer surfaces of said body member are square in lateral cross-section and equal in size, and wherein the diameters of said first and second cylindrical outer surfaces of said body member are equal.

7. The apparatus as defined in claim 6 wherein the perpendicular distance between said pair of parallel leg portions of said bifurcated spring clip means is slightly greater than the length of one side of said first substantially square outer surface of said body member when said bifurcated spring clip means is in a relaxed condition.

8. Apparatus for securing an externally threaded line tap valve to the exterior of a penetrable tubing line having any one of a plurality of outside diameters, comprising:
   a body member having a substantially square lateral cross-section normal to the longitudinal axis thereof and including:
      a first end face and a second end face normal to the longitudinal axis thereof;
      an internally threaded longitudinal passage extending therethrough communicating said first and second end faces;

a first cylindrically shaped outer surface communicating with said first end face and coaxial with the longitudinal passage;

a second cylindrically shaped outer surface coaxial with said first cylindrically shaped outer surface and having a diameter equal thereto and positioned intermediate said first cylindrically shaped outer surface and said second end face of said body member; and the longitudinal widths of said first and second cylindrically shaped outer surfaces, the longitudinal distance between said first and second cylindrically shaped outer surfaces and the longitudinal distance between said second cylindrically shaped outer surface and said second end face of said body member being substantially equal;

a bifurcated clip member having a first lateral end face and a second lateral end face and a longitudinal length substantially equal to the width of the substantially square lateral cross-section of said body member, including:

an upwardly facing bottom portion having outer ends;

a pair of parallel leg portions extending upwardly from the respective outer ends of said upwardly facing bottom portion; and a pair of horizontal lips extending inwardly toward each other from the upper ends of said respective parallel leg portions, the inward edges of said lips being substantially parallel to each other and extending between the first and second lateral end faces of said bifurcated clip member, each lip edge including an arcuately shaped vertical notch formed therein intermediate the first and second end faces of said bifurcated clip member, said notches being sized, shaped and laterally spaced from one another to alternately receive the first and second cylindrically shaped outer surfaces of said body member therebetween, the perpendicular distance between the parallel portions of said lip edges extending between the vertical notches and the first and second end faces of said bifurcated clip member being less than the diameter of the cylindrical outer surfaces of said body member.

9. The apparatus as defined in claim 8 wherein said upwardly facing bottom portion of said bifurcated clip member is V-shaped and has an included angle of approximately 90°.

10. The apparatus as defined in claim 9 characterized further to include:

a V-shaped spacer member having an included angle of approximately 90° and disposed within the V-shaped body portion of said bifurcated clip member intermediate said bifurcated clip member and the exterior of a penetrable tubing line.

11. The apparatus as defined in claim 8 characterized further to include:

spacer member means for interposition between said bifurcated clip member and the exterior of a penetrable tubing line.

12. The apparatus as defined in claim 9 wherein said pair of horizontal lips of said bifurcated clip member are characterized further to include:

a laterally outwardly extending surface formed on each lip edge adjacent to and communicating with the first end face.

13. The apparatus as defined in claim 12 wherein said pair of horizontal lips of said bifurcated clip member are characterized further to include:

a laterally outwardly extending surface formed on each lip edge adjacent to and communicating with the second end face of said bifurcated clip member.

* * * * *